United States Patent
Tobita

(10) Patent No.: US 10,647,038 B2
(45) Date of Patent: May 12, 2020

(54) INJECTION MOLD, MOLD COMPONENT, METHOD FOR MANUFACTURING MOLDED ARTICLE, AND METHOD FOR MANUFACTURING DOME-TYPE COVER

(71) Applicant: CANON KABUSHIKI KAISHA, Tokyo (JP)

(72) Inventor: Shusuke Tobita, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 15/276,650

(22) Filed: Sep. 26, 2016

(65) Prior Publication Data

US 2017/0087752 A1    Mar. 30, 2017

(30) Foreign Application Priority Data

Sep. 30, 2015    (JP) .................. 2015-194019

(51) Int. Cl.
```
B29C 45/00       (2006.01)
B29C 45/27       (2006.01)
B29C 45/26       (2006.01)
B29D 25/00       (2006.01)
B29L 31/00       (2006.01)
B29K 69/00       (2006.01)
B29L 31/34       (2006.01)
```
(52) U.S. Cl.
CPC .......... *B29C 45/0025* (2013.01); *B29C 45/26* (2013.01); *B29C 45/2708* (2013.01); *B29D 25/00* (2013.01); *B29K 2069/00* (2013.01); *B29L 2031/34* (2013.01); *B29L 2031/773* (2013.01)

(58) Field of Classification Search
CPC . B29C 45/0025; B29C 45/26; B29C 45/2708; B29D 25/00; B29K 2069/00; B29L 2031/34; B29L 2031/773
See application file for complete search history.

(56) References Cited

U.S. PATENT DOCUMENTS

| | | | | |
|---|---|---|---|---|
| 4,575,443 A | * | 3/1986 | Moen | B29C 45/26 249/144 |
| 4,741,689 A | * | 5/1988 | Onizawa | B29C 45/2608 249/160 |
| 6,707,619 B1 | * | 3/2004 | Okuno | G08B 13/19632 348/E7.085 |

FOREIGN PATENT DOCUMENTS

| | | |
|---|---|---|
| CN | 101535027 A | 9/2009 |
| JP | 2000-244782 A | 9/2000 |

* cited by examiner

*Primary Examiner* — Michael M. Robinson
(74) *Attorney, Agent, or Firm* — Canon U.S.A. Inc., IP Division

(57) ABSTRACT

An injection mold includes a cavity formed by a plurality of members including at least a convex surface member and a concave surface member, and a gate formed by a plurality of members including at least a flash formation preventing member. One of the members forming the gate is disposed so as to be adjacent to one of the members forming the cavity, and is pressed against the adjacent member forming the cavity by a pressure of injected resin.

7 Claims, 9 Drawing Sheets

INJECTION MOLD, MOLD COMPONENT, METHOD FOR MANUFACTURING MOLDED ARTICLE, AND METHOD FOR MANUFACTURING DOME-TYPE COVER

BACKGROUND OF THE INVENTION

Field of the Invention

Aspects of the present invention relate to a mold for manufacturing a dome-type cover for a surveillance camera that is manufactured by injection molding, and a method for manufacturing a dome-type cover.

Description of the Related Art

In recent years, network cameras for surveillance have become popular. A wide variety of cameras are installed everywhere, for example, in the street, public facilities, and individual houses. Some of such cameras are housed in dome-type covers. FIG. 8 is a schematic view of a camera having a dome-type cover. To depict the camera in the dome-type cover, part of the dome-type cover is removed. In the dome-type cover 4, a lens barrel 9 can be three-dimensionally freely turned by rotating it in the swiveling direction 2 and the vertical direction 1, and any photographing direction can be selected to perform surveillance.

The dome-type cover functions to protect the camera from deterioration due to weather and vandalism. The dome-type cover is also an exterior component and is also a part of the optical system of the camera. FIG. 3 shows an overall view of the dome-type cover alone. The hemispherical optical effective region 5 is a light-transmitting surface, and requires a shape accuracy as high as that required for lenses. The open end of the hemispherical surface is connected to a substantially cylindrical portion 6, and the end of the substantially cylindrical portion 6 has a flange portion 7. The substantially cylindrical portion 6 is a shape for expanding the volume of an inner housing portion housing the camera. The flange portion 7 is a shape for joining the dome-type cover to a cover lens barrel 8.

To accommodate mass production, dome-type covers are generally manufactured by plastic injection molding. Cup-type containers having a similar shape are generally molded in such a manner that a pin gate for a hot runner is disposed at the center (zenith) of a surface forming a cup, and the flow length from the center (zenith) to the open end circumference of the container, which is the flow end, is uniform.

In the case of a dome-type cover, the center (zenith) of the dome is a light-transmitting surface. Therefore, if a gate mark is left, it deforms the optical surface, and gets in the way of camera photographing. For this reason, the same manufacturing method as that used for manufacturing containers cannot be used for manufacturing a dome-type cover. As disclosed in Japanese Patent Laid-Open No. 2000-244782, a side gate is generally provided at one end of the flange portion.

In Japanese Patent Laid-Open No. 2000-244782, a stationary mold and a movable mold are depicted such that they are each formed by one mold member. That is, a cavity, a gate, and a runner are all processed in one mold member. However, since it is difficult to place a large mold member on a processing machine, the cavity part is generally processed separately, as a separate member (a convex surface mold, a concave surface mold).

FIG. 9 shows an example enlarged view of the surroundings of a cavity of a conventional injection mold for a dome-type cover. Reference numeral 23 denotes a stationary side attachment plate, reference numeral 24 denotes a stationary side die set, reference numeral 25 denotes a convex surface mold, reference numeral 26 denotes a sprue bush, reference numeral 28 denotes a movable side die set, reference numeral 29 denotes a concave surface mold, reference numeral 32 denotes a center pin, reference numeral 30 denotes a sprue, reference numeral 27 denotes a runner, reference numeral 33 denotes a gate, and reference numeral 31 denotes a cavity.

In recent years, the network camera performance have improved, and an improvement in magnification and an improvement in resolution are being desired. When the magnification of a camera is improved, the size of the lens barrel is increased. Therefore, it is necessary to accordingly increase the size of a dome-type cover for covering this. In order to reduce a decline in optical properties due to the interposition of plastic to improve the resolution, a reduction in wall thickness is required.

To injection-mold a large and thin dome-type cover, it is necessary to set the injection molding conditions to a high injection speed and high pressure because the flow length is long and the channel resistance is large.

When injection molding is performed using a mold such as that shown in FIG. 9, during the charging step, high-injection-speed and high-pressure resin flowing through the gate 33 presses the side surface 36 of the convex surface mold 25, and deforms the side surface 36. Because the optical surface of the convex surface mold 25 is processed by rotary cutting, so it is manufactured separately from the stationary side die set 24. Therefore, a fitting gap 37 exists between the convex surface mold 25 and the stationary side die set 24. For this reason, the above-described pressing force expands the gap 37.

As a result, resin flows into the gap 37, and a flash 39 is formed on the bottom surface 38 of the flange portion as shown in FIG. 10, which is a sectional view of the dome-type cover before removing a runner and gate.

The bottom surface 38 of the flange portion touches the camera main body. Therefore, when the flash 39 is formed, the attachment attitude of the dome-type cover is not stable. For this reason, the flash needs to be removed in post-processing, and the cost increases.

There is a case of a mold structure in which, to stabilize demolding, the convex surface mold 25 is slid out before demolding. In that case, flashes remain and accumulate on the sliding surface and interfere with mold operation, and productivity is lowered.

SUMMARY OF THE INVENTION

In an aspect of the present invention, an injection mold includes a cavity formed by a plurality of members including at least a convex surface member and a concave surface member, and a gate formed by a plurality of members including at least a flash formation preventing member. One of the members forming the gate is disposed so as to be adjacent to one of the members forming the cavity, and is pressed against the adjacent member forming the cavity by a pressure of injected resin.

According to an aspect of the injection mold for a dome-type cover, when resin passes through a side gate in the charging step, owing to a structure in which an insert for preventing flash formation receives the resin pressure, the insert is biased toward the convex surface mold. Charging progresses in such a state, resin passing though the side gate directly collides with the side surface of the convex surface mold, presses and deforms the side surface, and expands the gap between the convex surface mold and the stationary side die set. Since the biasing force is acting, the insert for preventing flash formation follows the deformation and the expansion of the gap, and molding can be completed while keeping the gap closed. Since the gap is closed by a force utilizing the resin pressure, it is possible to resist a force that forms a flash with the resin pressure. A dome-type cover free from a flash can be continuously obtained.

Further features of the present invention will become apparent from the following description of exemplary embodiments with reference to the attached drawings.

DESCRIPTION OF THE EMBODIMENTS

An embodiment that is an example of an injection mold of the present invention will be described. FIGS. 1A to 1D are enlarged views of the surroundings of a cavity of an injection mold according to an embodiment of the present invention, and are schematic views illustrating the manufacturing process of a molded article. FIGS. 2A to 2C are partially enlarged views of the injection mold shown in FIGS. 1A to 1D. FIGS. 2A to 2C enlarge the gate part and illustrate the state in the cavity when resin passes through the gate.

Figure 1A:
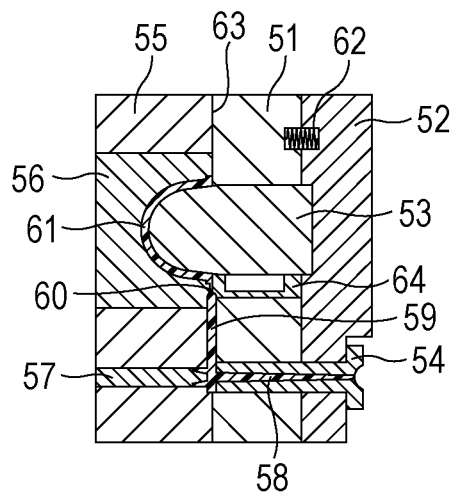
FIG. 1A is an enlarged view of the surroundings of a cavity of an injection mold for a dome-type cover shown in an embodiment (before the opening of the mold)
Figure 1C:
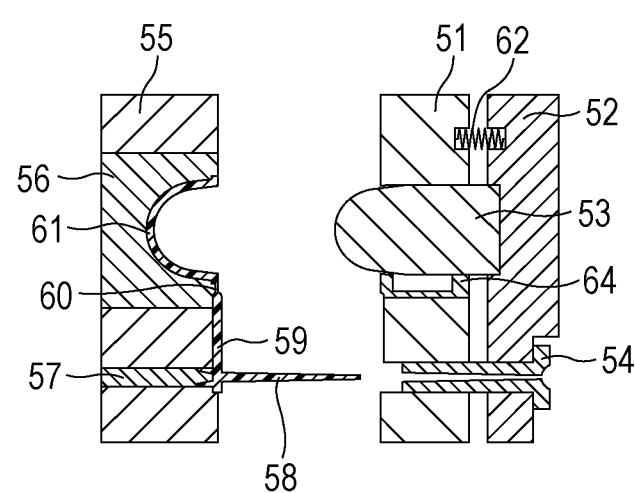
FIG. 1C is an enlarged view of the surroundings of a cavity of an injection mold for a dome-type cover shown in an embodiment (the parting line is opened)

FIG. 1A is a sectional view of an injection mold showing the state after the charging of resin is completed and before the mold opening operation. In FIGS. 1A to 1D and FIGS. 2A to 2C, reference numeral 51 denotes a stationary side die set, reference numeral 52 denotes a stationary side attachment plate, reference numeral 53 denotes a convex surface mold, reference numeral 54 denotes a sprue bush, reference numeral 55 denotes a movable side die set, reference numeral 56 denotes a concave surface mold, and reference numeral 63 denotes a parting line. Reference numeral 57 denotes a center pin, reference numeral 58 denotes a sprue, reference numeral 59 denotes a runner, reference numeral 60 denotes a gate, reference numeral 61 denotes a dome-type cover (molded article), and reference numeral 66 denotes a cavity.

A spring 62 is interposed between the stationary side die set 51 and the stationary side attachment plate 52. The convex surface mold 53 and the sprue bush 54 are joined to the stationary side attachment plate 52 with bolts (not shown).

Reference numeral 64 denotes a flash formation preventing member that is a mold component. The flash formation preventing member 64 is adjacent to the convex surface mold 53. The flash formation preventing member 64 is one of the members forming the gate, and doubles as part of a cavity that transfers part of the flange bottom of the dome-type cover. In the injection mold, the cavity 66 and the gate 60 are spaces communicating with each other. By injecting resin into these spaces, a molded article is manufactured. The space forming the cavity 66 and the gate 60 is formed by the convex surface mold 53, the concave surface mold 56, the stationary side die set 51, and the flash formation preventing member 64. That is, the space forming the cavity 66 and the gate 60 is formed by a plurality of members. The flash formation preventing member may be hereinafter simply referred to as mold component.

Although FIG. 1A shows the state when the charging of resin is completed, the progression of the charging of resin and the state in the cavity 66 before reaching the state of FIG. 1A will be described with reference to FIG. 2A, FIG. 2B, and FIG. 2C.

FIG. 2A shows a state right after resin passes through the gate 60. FIG. 2B shows a state in which charging has progressed slightly from the state of FIG. 2A. FIG. 2C shows the flash formation preventing member 64 that is a mold component.

The flash formation preventing member 64 has a resin channel 651 and a resin receiving portion 65. The resin receiving portion 65 has a surface that faces in a direction intersecting with the resin flow direction of the resin channel 651 (the resin injection direction or the longitudinal direction of the resin channel), and has a structure directly receiving the resin pressure. In other words, the flash formation preventing member 64 that is a mold component has a groove portion 651 serving as a resin channel, and a part 652 that is adjacent to the longitudinal direction of the groove portion 651 and in which no groove is formed (or a groove portion shallower than the groove portion 651). In a part of the part 652 in which no groove is formed (or the groove portion shallower than the groove portion 651) adjacent to the groove portion 651, a surface that faces in a direction intersecting with the longitudinal direction of the groove portion is formed, and that surface is the resin receiving portion 65.

The flash formation preventing member 64 is disposed so as to be adjacent to the convex surface mold 53. When the resin receiving portion 65 receives the resin pressure (pressure from resin), the resin pressure acts on the resin receiving portion 65. The flash formation preventing member 64 bends in the direction of arrow X (toward the convex surface mold 53, which is the adjacent member), which is the direction of the normal of the side surface of the convex surface mold 53 (direction colliding with the side surface), and the flash formation preventing member 64 is pressed against the side surface of the convex surface mold 53.

The flash formation preventing member 64 can have a bridge portion 70 in order to reduce the rigidity. The flash formation preventing member 64 can thereby be made more deformable and bendable in the X direction.

Figure 7A:
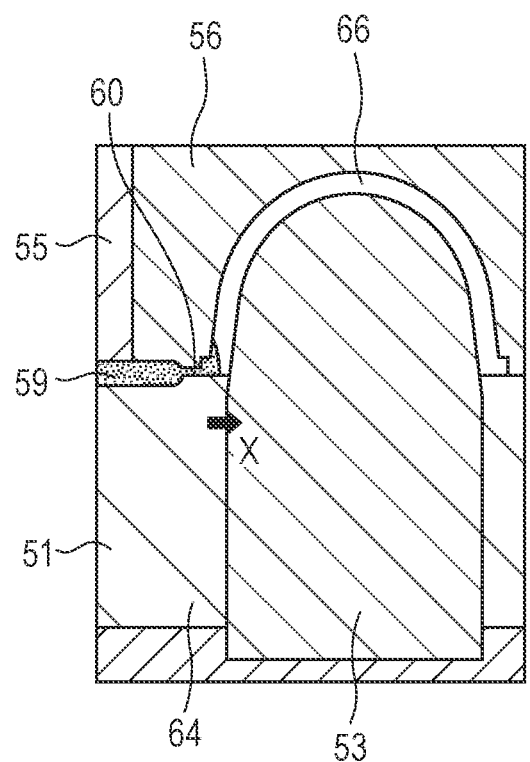
FIG. 7A shows the state in the cavity of Comparative Example 1 (conventional example) (early stage of charging)
Figure 7B:
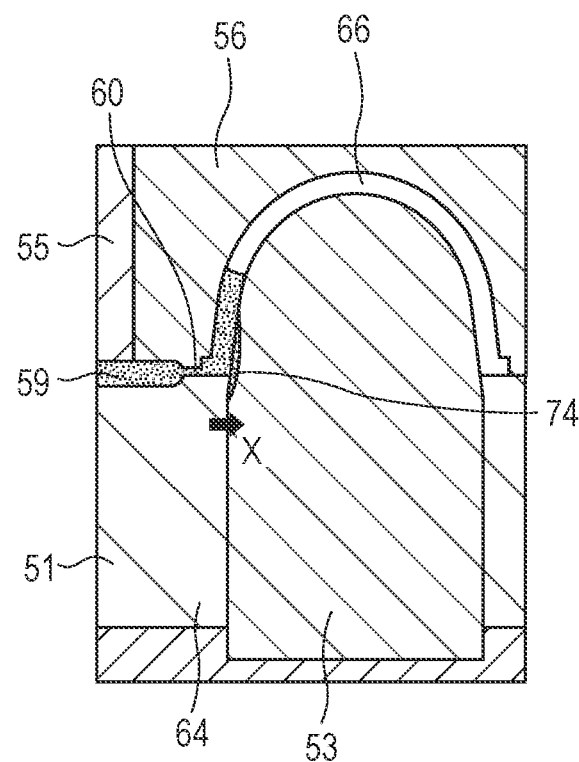
FIG. 7B shows the state in the cavity of Comparative Example 1 (conventional example) (early stage of charging).
Figure 8:
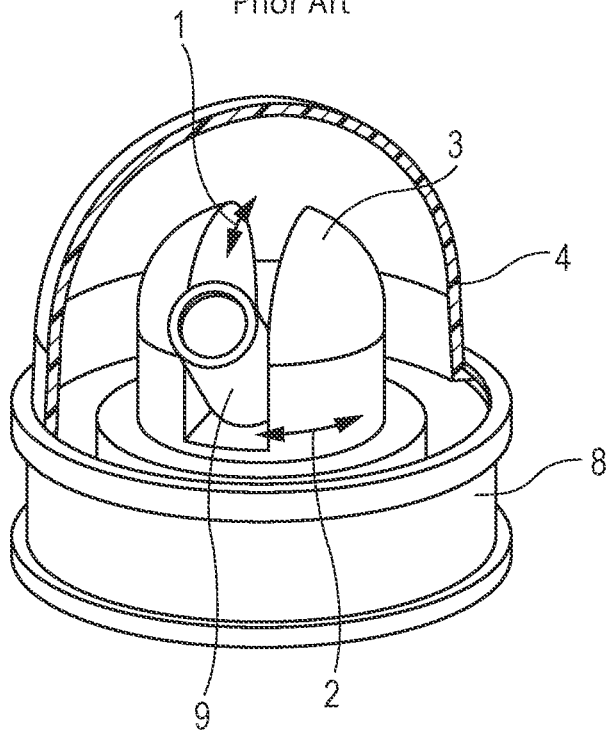
FIG. 8 is a schematic view of a camera having a dome-type cover.

FIG. 2B shows a state in which charging has progressed slightly from the state of FIG. 2A. FIG. 2B shows a state in which the flash formation preventing member is deformed and bent in the X direction. For comparison, a conventional mold will be described with reference to FIG. 7A and FIG. 7B. In FIGS. 7A and 7B, the same reference numerals will be used to designate the same components as those in FIGS. 1A to 1D and FIGS. 2A to 2C, and the description thereof will be omitted. FIG. 7A schematically shows a state right after resin has passed through the gate 60. FIG. 7B schematically shows a state in which charging has progressed slightly from the state of FIG. 7A. The conventional mold does not have the flash formation preventing member 64 of this embodiment, and the stationary side die set 51 is one of the members forming the gate, and doubles as part of a cavity that transfers part of the flange bottom of the dome-type cover. The stationary side die set 51 is not deformed and bent in the X direction. Therefore, as shown in FIG. 7B, the convex surface mold 53 is deformed by the resin pressure, and a gap 74 is formed between the convex surface mold 53 and the stationary side die set 51 forming the gate. However, in this embodiment, as shown in FIG. 2B, the formation of a gap between the convex surface mold 53 and the flash formation preventing member 64 is prevented by the deformation and bending of the flash formation preventing member 64. That is, resin is injected with the flash formation preventing member 64 abutted on the convex surface mold 53.

To comprehensibly describe the mechanism of this embodiment, the deformation of the mold and the amount of deformation of the flash formation preventing member are exaggerated.

As shown in FIG. 7B, if the stationary side die set 51 forming the gate is not deformed, the cavity expands, a gap also expands between the convex surface mold 53 and the stationary side die set 51 forming the gate, and a space 74 is formed. In this embodiment, the formation of a gap between the convex surface mold 53 and the flash formation preventing member 64 is prevented by deforming the flash formation preventing member 64. That is, as shown in FIG. 2B, since charging progresses with the flash formation preventing member 64 pressed in the X direction by the resin pressure, and the flash formation preventing member 64 bends in the X direction, the formation of a gap between the convex surface mold 53 and the flash formation preventing member 64 is prevented. Thereby, the formation of a flash on the flange bottom portion of the molded article can be prevented.

As shown in FIG. 2B, as a result of the bending of the flash formation preventing member 64, the gap between the flash formation preventing member 64 and the stationary side die set 51 expands, and a flash 71 may be formed on the runner. However, this is not a problem because the runner is cut off by gate cutting.

Figure 4A:
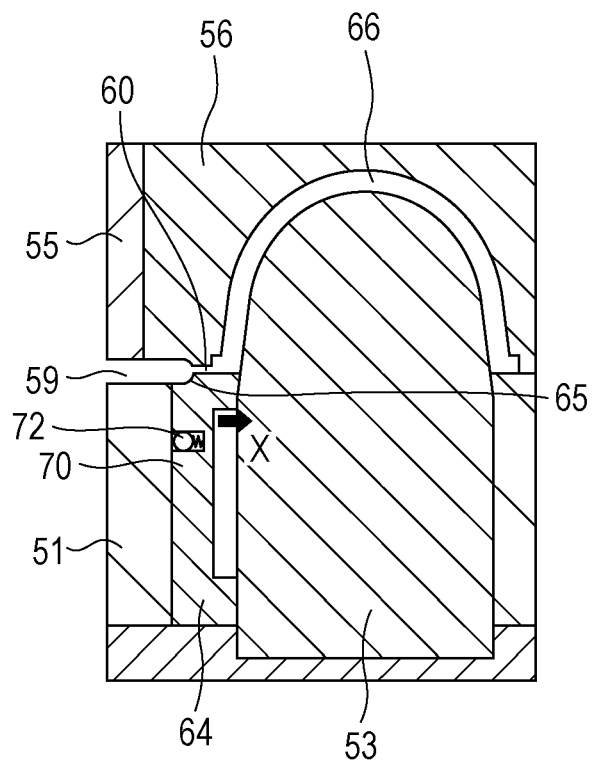
FIG. 4A shows a second embodiment of a flash formation preventing member disposed in a mold.
Figure 4B:
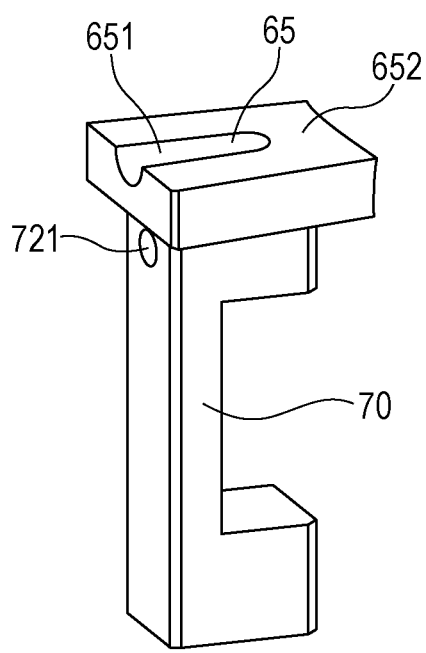
FIG. 4B shows a second embodiment of a flash formation preventing member (mold member).

FIGS. 4A and 4B show a second embodiment of a flash formation preventing member. In FIGS. 4A and 4B, the same reference numerals will be used to designate the same components as those in FIGS. 1A to 1D and FIGS. 2A to 2C, and the description thereof will be omitted. FIG. 4A shows a second embodiment of a flash formation preventing member disposed in a mold, and FIG. 4B shows a second embodiment of a flash formation preventing member (mold member). As shown in FIGS. 4A and 4B, for the purpose of assisting the operation of the flash formation preventing member 64, a ball plunger 72 may be added to the flash formation preventing member 64. The ball plunger 72 is interposed between the stationary side die set 51 and the flash formation preventing member 64. The ball plunger 72 generates a force biasing the flash formation preventing member 64 in the X direction, with the flash formation preventing member 64 incorporated in the stationary side die set 51. The ball plunger 72 is merely an example. As long as the same effect can be obtained, the biasing unit may be another unit such as a spring, a slide, or an external power. An attachment portion 721 for installing a biasing unit is formed in the mold member.

Figure 5A:
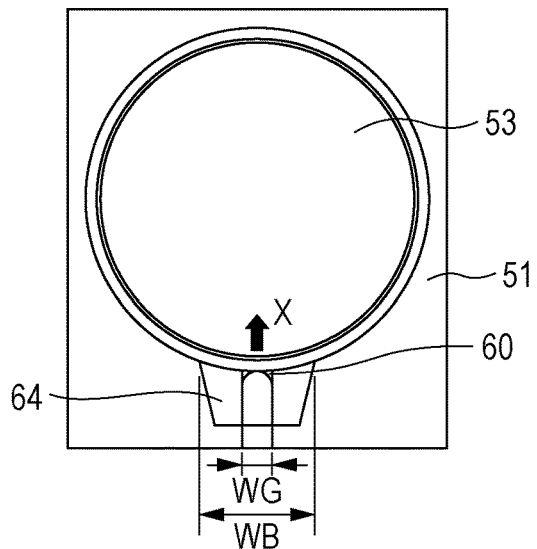
FIG. 5A is a view of the stationary side of the mold as seen from the parting line (the outer shape of the flash formation preventing member is reverse-tapered)
Figure 5B:
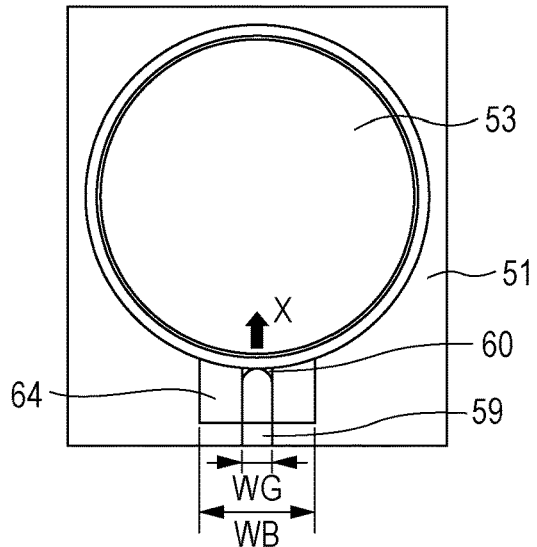
FIG. 5B is a view of the stationary side of the mold as seen from the parting line (the outer shape of the flash formation preventing member is straight)
Figure 5C:
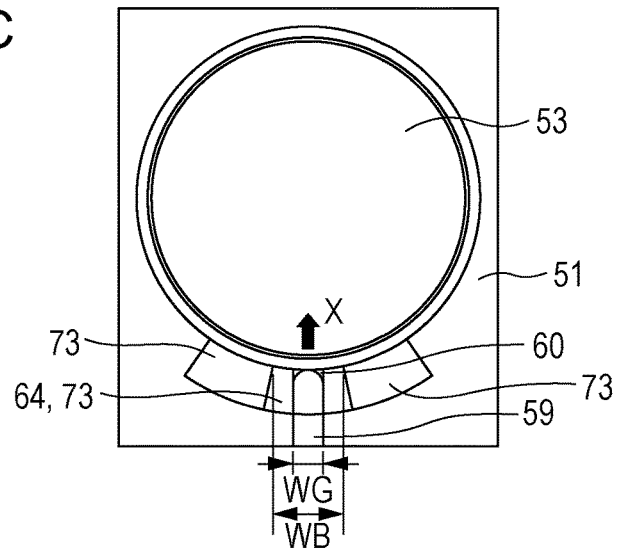
FIG. 5C is a view of the stationary side of the mold as seen from the parting line (the outer shape of the flash formation preventing member is a partial ring).

FIG. 5A, FIG. 5B, and FIG. 5C are views of the stationary side of the mold as seen from the parting line. In FIGS. 5A to 5C, the same reference numerals will be used to designate the same components as those in FIGS. 1A to 1D and FIGS. 2A to 2C, and the description thereof will be omitted.

As shown in FIG. 5A to 5C, the outer shape of the flash formation preventing member 64 is not particularly limited as long as the flash formation preventing member 64 is structurally movable in the X direction. The flash formation preventing member 64 may be rectangular as shown in FIG. 5B, but can have a reverse-tapered shape such that the width becomes larger toward the convex surface mold 53 as shown in FIG. 5A because the resistance to movement is small. The width of the flash formation preventing member 64 can be changed according to the range in which the flash is formed. For example, the width WB of the flash formation preventing member 64 is preferably 1.5 times the gate width WG. For example, when the gate width WG is 10 mm, the width WB of the flash formation preventing member 64 is preferably 15 mm or more. The flash is formed mainly on the gate, and in the vicinity thereof. Depending on the injection pressure, the flash is formed significantly in a region having a width of about 1.5 times the gate width. Therefore, to prevent the formation of this flash, it is preferable to use a flash formation preventing member 64 having a width of at least 1.5 times the gate width. The width WB of the flash formation preventing member is defined as the width of the side in contact with the convex surface mold 53 as seen from the opposite mold side when the mold is opened. The gate width WG is defined as the width of the part in contact with the cavity as seen from the opposite mold side when the mold is opened.

As shown in 5C, partial ring-like members 73 may be disposed so as to be adjacent to the flash formation preventing member 64 so that the intervals between respective members can be adjusted.

The mirror surface piece is made of annealed stainless material, whereas the flash formation preventing member 64 can be made of unannealed raw stainless material. The flash formation preventing member 64 repeatedly interferes with the side surface of the convex surface mold 53. Since raw material is lower in hardness than annealed material, the side surface of the mirror surface piece can be prevented from being damaged. When the flash formation preventing member 64 is worn out, it can be replaced inexpensively.

Resin is charged to the cavity, and, after dwelling, the opening of the mold is started.

Figure 1B:
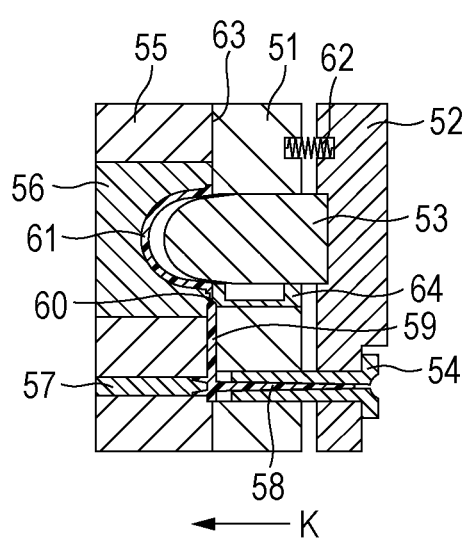
FIG. 1B is an enlarged view of the surroundings of a cavity of an injection mold for a dome-type cover shown in an embodiment (right after the opening of the mold)
Figure 2A:
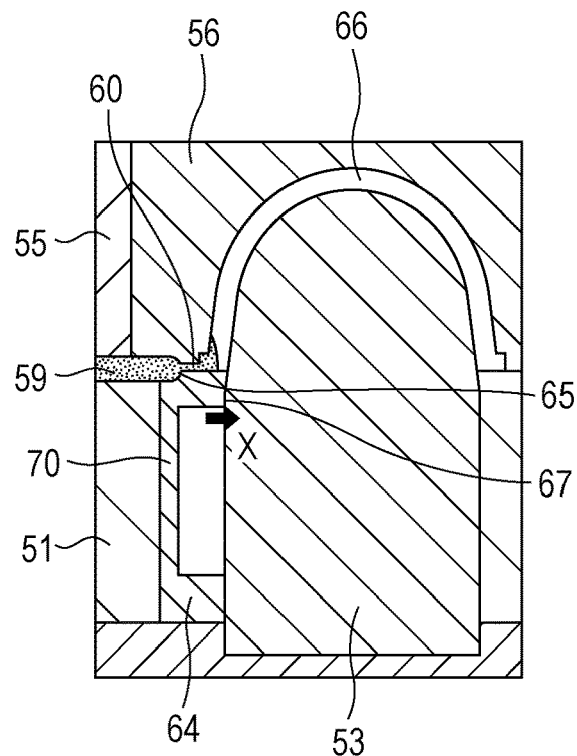
FIG. 2A shows the state in the cavity (early stage of charging)
Figure 2B:
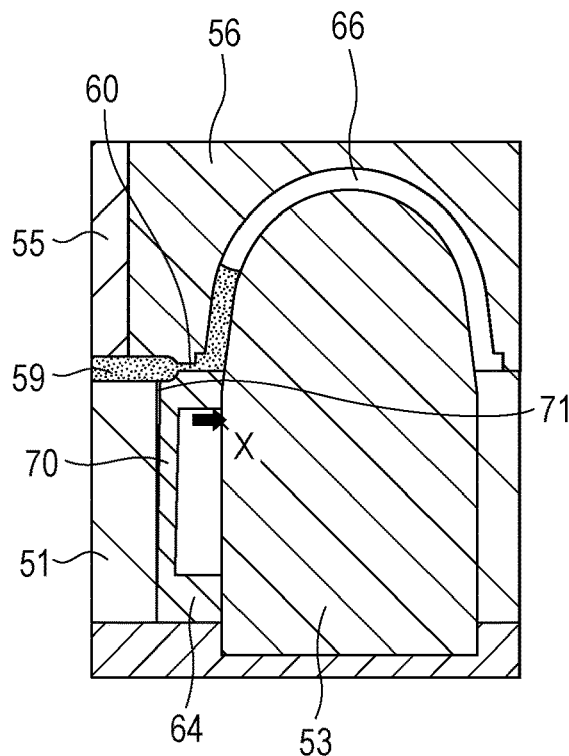
FIG. 2B shows the state in the cavity (charging has progressed, the flash formation preventing member is operating)
Figure 2C:
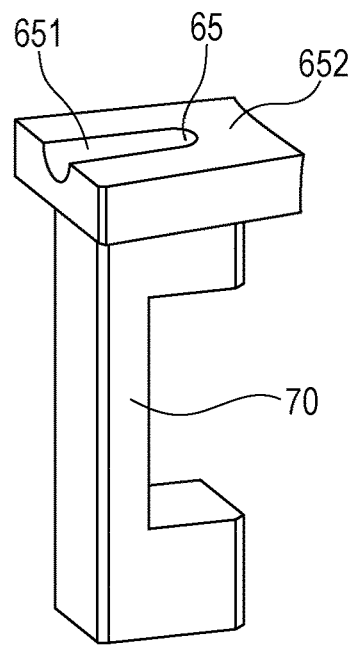
FIG. 2C shows a flash formation preventing member (mold member).
Figure 3:
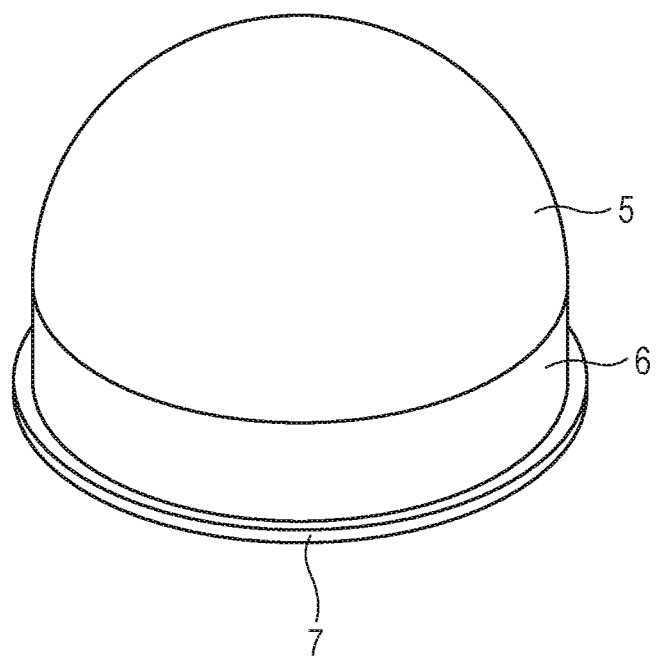
FIG. 3 shows an overall view of the dome-type cover alone.

FIG. 1B shows a state right after the start of the opening of the mold. Before the parting line 63 is opened, by the action of the spring 62, the stationary side die set 51 and the stationary side attachment plate 52 are separated from each other (the stationary side die set 51, the movable side die set 55, and the concave surface mold 56 are moved in the mold opening direction (K direction). Owing to this separation, the convex surface mold 53 fixed to the stationary side attachment plate 52 is separated from the molded article. The resin solidified in the sprue moves in the mold opening direction (K direction), and is thereby separated (demolded) from the surface of the sprue bush 54 fixed to the stationary side attachment plate 52.

Referring to FIG. 1C, the movable side die set 55 and the concave surface mold 56 move further in the demolding direction (K direction), the parting line 63 is thereby opened, and the concave surface mold 56 retracts to the mold opening completing position with the molded article 61 stuck thereto.

Figure 1D:
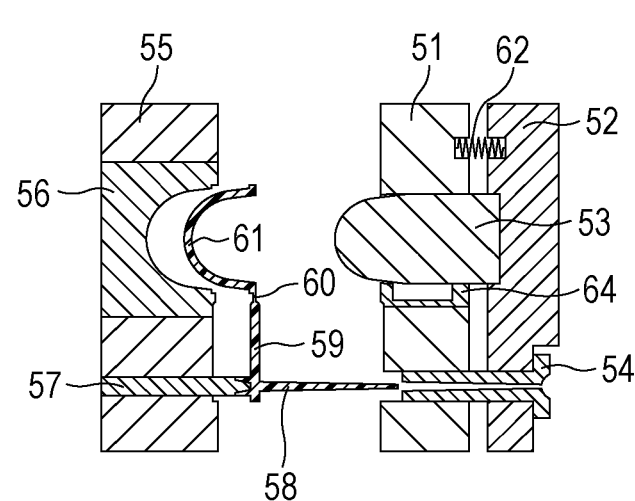
FIG. 1D is an enlarged view of the surroundings of a cavity of an injection mold for a dome-type cover shown in an embodiment (ejection is completed).

FIG. 1D shows a state in which ejection is completed and all demolding operations are completed. The center pin 57 protrudes to separate the molded article 61 from the concave surface mold 56 (demolding), and a take-out operation to discharge the molded article 61 out of the mold is performed. Although omitted to simplify the figure, in order to eject the molded article 61 more stably, it is desirable to dispose an ejector pin in the flange portion.

EXAMPLE

Next, an example will be described.

A dome-type cover was molded using the injection mold shown in FIGS. 1A to 1D and FIGS. 2A to 2C described in the first embodiment. The resin material was polycarbonate. The molding conditions were as follows: the resin temperature was 300° C., a cylinder of ϕ40 was used, the injection speed was 100 mm/s, the dwelling was 130 Mpa, the mold temperature was 140° C., and the cycle time was 300 seconds.

Figure 6:
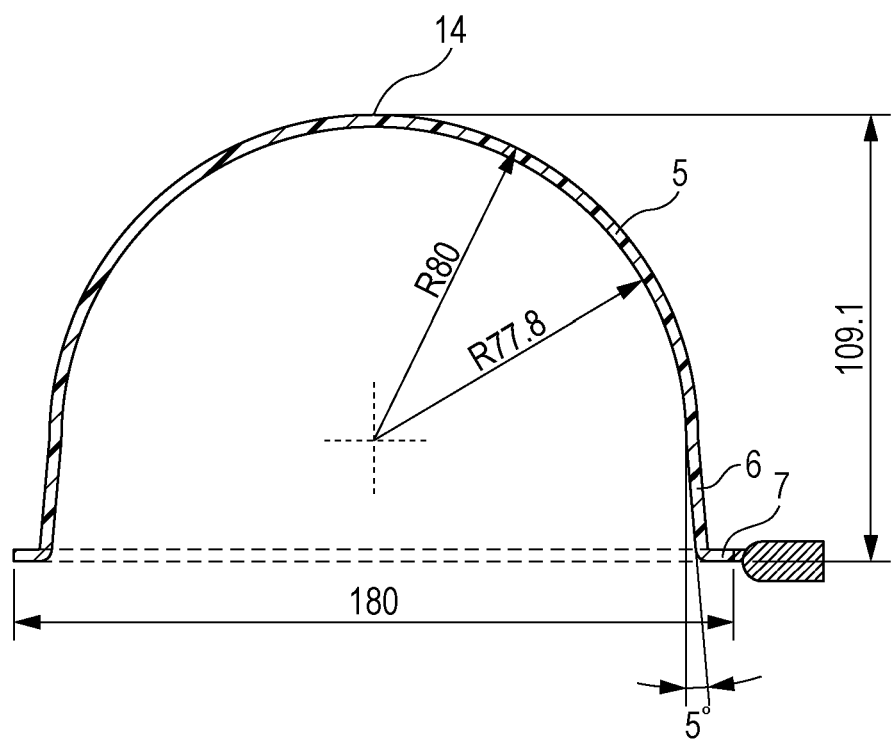
FIG. 6 is a central sectional view of a dome-type cover molded using the injection mold of Example 1.

FIG. 6 is a central sectional view of the molded dome-type cover.

As shown in FIG. 6, the outer shape of the flange of the dome had a diameter of 180 mm. The outside radius of the hemispherical portion 5 was 80 mm, and the inside radius of the hemispherical portion 5 was 77.8 mm. The thickness was 2.2 mm. The distance from the bottom of the flange portion 7 to the zenith 14 was 109.1 mm. The substantially cylindrical portion 6 was inclined at an angle of 5°.

A visual inspection was performed and no flash was observed on the bottom of the flange portion 7.

Figure 9:
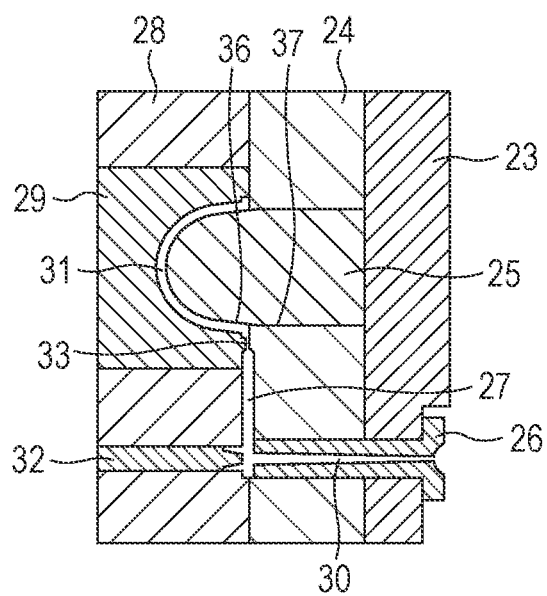
FIG. 9 is an enlarged view of the surroundings of a cavity of a conventional injection mold for a dome-type cover.
Figure 10:
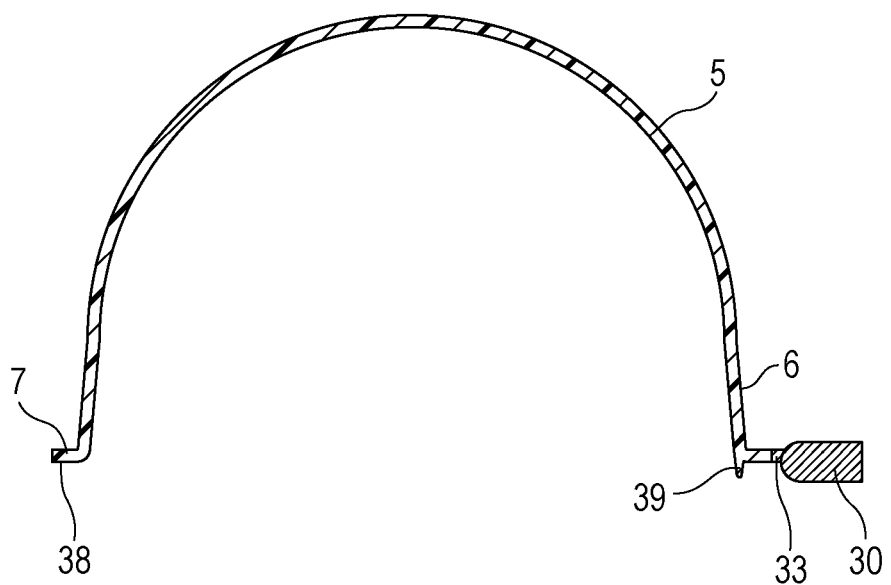
FIG. 10 is a sectional view of a conventional dome-type cover with a runner and a gate.

As Comparative Example 1, a dome-type cover was molded using the conventional injection mold shown FIG. 7A, FIG. 7B, and FIG. 9 which is not provided with a flash formation preventing member. Other conditions, such as the resin material in the mold and molding conditions, were all the same as those in the example.

A clearly visible flash was formed on the flange bottom of the molded article. From this, it can be seen that, as shown in FIG. 7B, the convex surface mold was deformed and moved by the resin pressure, resin flowed into the space 74 formed by expansion of the gap between the convex surface mold 53 and the stationary side die set 51, and a flash was formed on the flange bottom.

While aspects of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-194019 filed Sep. 30, 2015, which is hereby incorporated by reference herein in its entirety.

What is claimed is:

1. An injection mold comprising:
   a cavity formed by a plurality of members including at least a convex surface member and a concave surface member; and
   a gate formed by a plurality of members including at least a flash formation preventing member,
   wherein the flash formation preventing member is disposed so as to be adjacent to the convex surface member,
   wherein the flash formation preventing member comprises a resin channel formed by a groove portion and a resin receiving portion having a surface formed in a direction intersecting with a longitudinal direction of the groove portion, and the longitudinal direction of the groove portion is a flow direction of resin in the resin channel and is the same as a resin injection direction of the gate,
   wherein the flash formation preventing member has a bridge portion configured to bend so as to allow the flash formation preventing member to be deformable in the longitudinal direction of the groove portion toward the convex surface member, and
   wherein when resin pressure acts on the resin receiving portion, the flash formation preventing member is deformed in the longitudinal direction and is pressed against a cavity side surface of the convex surface member adjacent thereto by a pressure of injected resin.

2. The injection mold according to claim 1, wherein the cavity has a space for forming a flange portion, the gate communicates with the space for forming the flange portion, and the flash formation preventing member forms a part of the space for forming the flange portion.

3. The injection mold according to claim 1, wherein the injection mold further comprises a biasing unit, and the flash formation preventing member comprises an attachment portion for attaching the biasing unit.

4. A method for manufacturing a molded article, the method comprising:
   injecting resin into a gate formed by a plurality of members, including at least a flash formation preventing member, and a cavity formed by a plurality of members, including at least a convex surface member and a concave surface member,
   wherein the flash formation preventing member is disposed so as to be adjacent to the convex surface member,
   wherein the flash formation preventing member comprises a resin channel formed by a groove portion and a resin receiving portion having a surface formed in a direction intersecting with a longitudinal direction of the groove portion, and the longitudinal direction of the groove portion is a flow direction of resin in the resin channel and is the same as a resin injection direction of the gate, wherein the flash formation preventing member has a bridge portion configured to bend so as to allow the flash formation preventing member to be deformable in the longitudinal direction of the groove portion toward the convex surface member, and wherein when resin pressure acts on the resin receiving portion, the flash formation preventing member is deformed in the longitudinal direction and is pressed against a cavity side surface of the convex surface member adjacent thereto by a pressure of injected resin.

5. The method for manufacturing a molded article according to claim 4, wherein the cavity has a space for forming a flange portion, the gate communicates with the space for forming the flange portion, and the flash formation preventing member forms a part of the space for forming the flange portion.

6. A method for manufacturing a dome-type cover that manufactures a dome-type cover by the method for manufacturing a molded article according to claim 4.

7. The method for manufacturing a molded article according to claim 4, wherein the injection mold further comprises a biasing unit, and the flash formation preventing member comprises an attachment portion for attaching a biasing unit.

* * * * *